Oct. 4, 1932.  B. HUGHES  1,880,320
RADIO SYSTEM
Filed Aug. 14, 1929
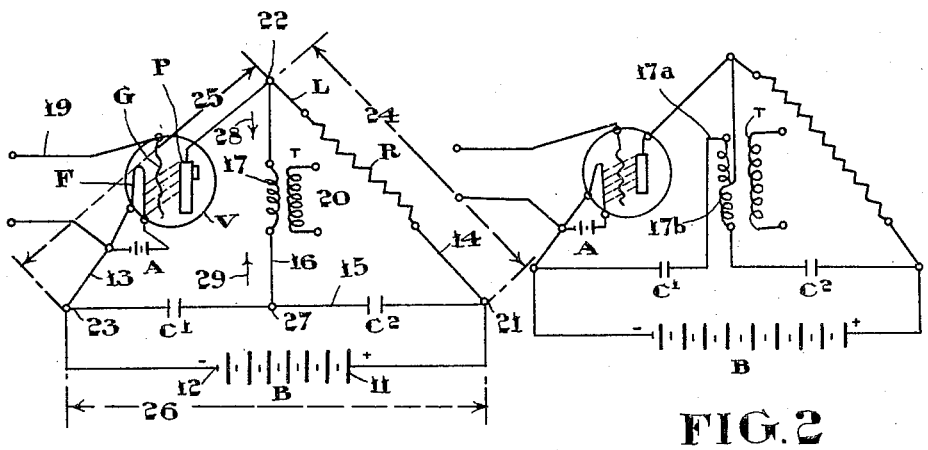
FIG.1    FIG.2
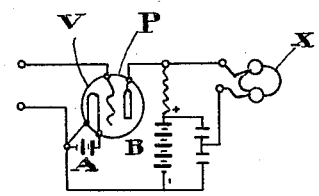    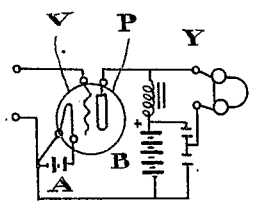
FIG.3    FIG.4
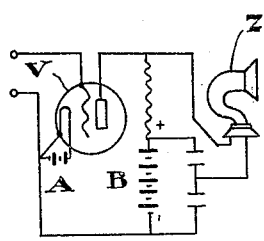    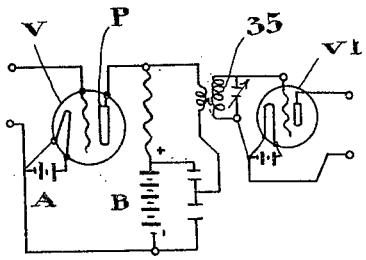
FIG.5    FIG.6
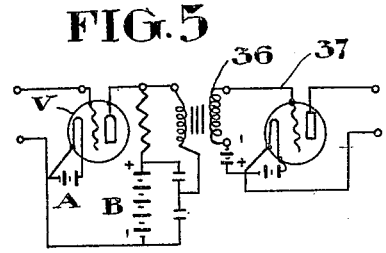
FIG.7
INVENTOR
BENJAMIN HUGHES
BY Fetherstonhaugh & Co
ATTORNEYS Patented Oct. 4, 1932

1,880,320

UNITED STATES PATENT OFFICE

BENJAMIN HUGHES, OF MONTREAL, QUEBEC, CANADA

RADIO SYSTEM

Application filed August 14, 1929, Serial No. 385,923, and in Canada August 15, 1928.

This invention relates to new and useful improvements in radio systems and particularly to systems wherein a valve is used to provide a pulsating or varying value of the current flowing between its plate and its filament.

The object of the invention is to provide a combination of elements which will pick up or effectively establish a place of linkage with the output circuit of an electric valve or electronic tube so that the connecting network will bear such electrical character and relation to the output circuit that when a variation in the current flowing in the plate circuit occurs, the effect of this variation will be electrically rendered at the greatest possible magnitude and fidelity of wave form at the points of linkage or connection, thereby allowing the transient electrical energy, occurring in the plate circuit by reason of the action of the valve, to be transferred to other electrical devices to produce the maximum effect from the said valve action.

My invention consists in placing condensers between the positive and negative side of the current supply to the plate of an electric valve and placing the condensers one on each side of the primary coil circuit connection so that the variation of the potential which occurs across the valve and across the series impedence or resistance in the plate circuit are brought to bear upon the same path so that the potential of the source of power is entirely utilized.

In the drawing which illustrates my invention:—

Figure 1 is a diagrammatic illustration of my improved circuit for picking up transient electrical energy from the output circuit of an electrical valve or tube.

Figure 2 is a diagrammatic illustration of the circuit shown in Figure 1.

Figures 3, 4, 5, 6, and 7 show diagrammatic illustrations of the various uses to which my improved circuit may be applied.

Referring more particularly to the drawing, A is an electric storage battery for supplying current to heat the filament F of the electric tube or electronic valve V. This battery is commonly called the "A" battery.

The plate P of the valve is supplied with current from the battery B through the line L which is connected to the positive side 11 of the said battery. A resistance R is placed in the line 14. One end of the filament F is connected to the negative terminal 12 of the battery B by means of the line 13. Extending between the lines 13 and 14 is the line 15 and positioned in said line are the capacitances or condensers C1 and C2. A wire 16 extends between the primary coil 17 and the line 15 between the condensers. The other end of the primary coil of the transformer T is connected to a terminal positioned in the line 14 between the resistance R and the valve plate P. The input is connected by the line 19 to the grid G of the valve V. The output from the device is through the secondary coil 20 of the transformer T. The scheme is shown diagrammatically in its simplest form in Figure 1. While a constant value of potential exists on the grid G of the valve V, there will be a constant value of the current flow through the plate circuit 14 across to the filament and back through the line 13 to the negative side of the battery B. While this current is flowing there will be a difference of potential between the points 21 and 22 caused by the resistance R and also a difference of potential between the points 22 and 23 caused by the resistance or impedance of the path between the plate and filament in the valve V. This offers two places outside of the battery B where a difference of potential exists in the plate circuit and these places are shown by the dotted lines 24 and 25. It will be seen that the sum of the potentials at 17 and 16 equals the potential of the battery B as shown in dotted lines 26. Now these two potentials existing at 24 and 25 are stored up in the form of an electric charge in the capacities or condensers C1 and C2 because the condenser C2 is connected across the resistance R by the connection 15 between the points 21, 27 and 23, the primary coil 17 of the transformer forming part of the circuit. The condenser C1 is connected across the plate P and filament F of the valve by being connected to the points 23, 27 and 22, the primary coil forming a part of the circuit. The primary coil 17 of the transformer T is a common path for both condensers C1 and C2 and any change in the potentials of the condensers C1 and C2 will cause a current in the primary coil of the transformer T.

As one example, we will take the case where there is a rise in the negative charge of the grid. An increase in impedance in the valve V by its grid action will cause an increase of the potential at 25, and will also cause a decrease of the current flowing from the battery B through the resistance R. This decrease in current through the resistance R will cause a decrease in potential at 24. With this change of plate current, both the condensers C1 and C2 will readjust their respective charges and in so doing cause current to flow through the primary coil 17. Under this condition, the flow of current from both condensers will be in the same direction through the primary coil 17 of the transformer T as indicated by the arrow 28, because condenser C1 will receive a charge, the current proceeding from the point 22 and flowing as indicated by the arrow 28. The condenser C2 will deliver up a charge, the current flowing from the point 21 through the resistance R and back through the primary coil 17 in the direction of the arrow 28. It will thus be seen that both condensers are made to readjust their charges through the primary coil of the transformer T. Another example to illustrate the operation of the elements is taken, that is, when there is a lowering of the negative charge of the grid G. Any decrease in impedance in the valve V by its grid action will cause a decrease of the potential at 25. This will also cause an increase in the current flowing from the battery B through the resistance R. The increase in the current flowing from the battery B through the resistance R causes an increase in potential at 24, changing the plate current. With this change in the plate current, both condensers C1 and C2 will again adjust themselves to the new potential values at 25 and 24, and in so doing, cause a current to flow through the primary coil of the transformer. Under this condition, the flow of current from both condensers is as indicated by the arrow 29 which is in the opposite direction to the arrow 28.

It is apparent that a rise and fall of current intensity in the plate circuit of the valve V, by reason of the grid action within the valve itself, will by the combination herein disclosed, cause an alternating current to flow between the points 27 and 22 and that this current will be twice the value of other methods which utilize only the potential difference of either the valve V or resistance R.

The modification shown in Figure 2 is somewhat similar to that shown in Figure 1 except that the primary coil is divided into two sections, 17a and 17b, and condenser C1 is the connection between the said sections, while the condenser C2 is connected to the lower part of section 17b of the primary coil of transformer T as shown in Figure 1. With this arrangement, the condensers C1 and C2 may be so proportioned with the primary sections 17a and 17b, that a fairly flat characteristic can be accomplished at the output 20. In Figure 3, the resistance is placed between the positive side of the battery B and the plate of the valve V and the connection between the condensers passes through the phones X to the plate. In Figure 4, an inductance coil Y is used instead of the resistance shown in Figure 3 otherwise all other parts of the circuit are the same. In Figure 5, the output circuit is connected to a loud speaker horn Z. In Figure 6, the output from the circuit is connected in the usual manner to another lamp V1 and its circuit through the secondary coil of the transformer and a variable condenser 35 is shunted across the terminals of the secondary coil. In Figure 7, the output from the circuit is connected through the inductance coils 36 to a lamp circuit designated as a whole by the numeral 37.

Figures 3 to 7 inclusive are only illustrative of some of the uses to which my improved system may be applied. Stated concisely, my arrangement of obtaining or picking up transient electric energy which exists in the plate circuit of the valve, is an improvement on all other methods in use up to the present because in all other systems the potential variation which occurs either across the valve or across the series impedance only is used to transfer the electric energy, whereas in my method, the variation of potential which occurs both across the valve and the series impedance or resistance are both brought to bear upon the same path, and instead of only half of the potential of the source being used, the entire potential of the battery or source is utilized to produce the output effect.

Having thus described my invention, what I claim is:—

1. The combination with an electronic valve of a circuit including a source of current connected to the anode and cathode elements of the valve, an impedance member in series with said source and one of said elements, and capacity members in series with an impedance element across the anode and cathode and across the impedance member, the arrangement being such as to provide a common path whereby the potential variation occurring across the anode and cathode terminals and across the terminals of the impedance member are impressed, through the agency of said capacity members, upon the output terminals of the circuit.

2. The combination with an electronic valve of a circuit including a source of current connected to the anode and cathode elements of the valve, a resistance member in series with said source and one of said elements, a shunt connection across the terminals of the anode and cathode elements including a first inductive member in series with a first capacity member, a shunt connection across the terminals of the resistance member including a second inductive member in series with a second capacity member, and output terminals inductively coupled to both of said inductive members.

3. The combination with an electronic valve of a source of current connected to the anode and cathode elements of the valve, an impedance member in series with said source and one of said elements and means, including capacity members in series with an impedance element across the anode and cathode and across the impedance member, for causing the potential variation occurring across the valve terminals and across the terminals of the impedance member to be resolved into a resultant effect and impressed upon the output terminals of the circuit.

4. In a combination of circuits of the character described, a source of electric current, a main resistance member, an electric valve having anode and cathode elements, electrical conductors connected to form a path so that the current can pass from the positive side of the current source through the main resistance, through the valve from anode to cathode elements back to the negative side of the current source, a first shunt path composed of a capacitive member in series with an inductive member bridged across the terminals of the anode and cathode terminals of the valve; a second shunt path composed of a capacitive member in series with an inductive member bridged across the terminals of said main resistance member and output terminals inductively coupled to the two inductive members of the said first and second shunt paths.

In witness whereof, I have hereunto set my hand.

BENJAMIN HUGHES.